United States Patent [19]

Yanagidaira et al.

[11] Patent Number: 4,949,170

[45] Date of Patent: Aug. 14, 1990

[54] VIDEO INFORMATION TRANSMISSION SERVICE SYSTEM AND HEAD END DEVICE THEREFOR

[75] Inventors: Masatoshi Yanagidaira; Tsutomu Kanai, both of Tokyo, Japan

[73] Assignee: Pioneer Electronic Corporation, Tokyo, Japan

[21] Appl. No.: 321,139

[22] Filed: Mar. 9, 1989

[30] Foreign Application Priority Data

Sep. 22, 1988 [JP] Japan .................................. 63-236555

[51] Int. Cl.$^5$ ........................ H04N 7/10; H04N 7/173
[52] U.S. Cl. .......................................... 358/86; 370/3; 455/610
[58] Field of Search .................. 358/86; 370/3; 455/4, 455/5, 610, 612

[56] References Cited

U.S. PATENT DOCUMENTS

| | | | |
|---|---|---|---|
| 4,345,273 | 8/1982 | Barabas et al. ........................ | 358/86 |
| 4,382,266 | 5/1983 | Panzer ................................... | 358/86 |
| 4,402,008 | 8/1983 | Teraslinna ............................. | 358/86 |
| 4,441,180 | 4/1984 | Schüssler ................................ | 370/3 |
| 4,475,187 | 10/1984 | Barabas ............................... | 358/86 X |
| 4,616,256 | 10/1986 | Boutmy ................................. | 358/86 |
| 4,627,105 | 12/1986 | Ohashi et al. ........................ | 370/3 X |
| 4,760,442 | 7/1988 | O'Connell et al. ................... | 358/86 |
| 4,769,833 | 9/1988 | Farleigh et al. .................. | 358/86 X |

Primary Examiner—Jin F. Ng
Assistant Examiner—Stella Woo
Attorney, Agent, or Firm—Sughrue, Mion, Zinn, MacPeak & Seas

[57] ABSTRACT

A video signal coordination system which enables selective transmission of video signals from a plurality of sources with simpler digital switching systems which require fewer cross points and thus reduce the cost of the overall system. For each of a plurality of video source groups, an associated digital switching system is provided, so that the overall number of switching systems is equal to the number of video source groups. Queuing problems are avoided by having some duplication of video sources across various ones of the video source groups.

6 Claims, 2 Drawing Sheets

VIDEO INFORMATION TRANSMISSION SERVICE SYSTEM AND HEAD END DEVICE THEREFOR

BACKGROUND OF THE INVENTION

The present invention generally relates to a video information transmission service system using an optical fiber network constituted by optical fiber cables, and particularly relates to a video information transmission service system having a head end device for frequency-multiplexing a plurality of video sources selected from a number of video sources at subscribers' requests, and for transmitting the selected video sources to a number of optical fibers which together constitute an optical fiber cable. The system further includes terminal means for requesting information from the head end device and selecting information on the basis of indication from the head end device. The invention also relates to the head end device to use in the system.

Conventionally, a video information transmission service system is known which uses an optical fiber cable, as a network, constituted by a number of optical fibers which have a broad band characteristic wide enough to have a large signal capacity. Briefly, this kind of animation image information service system has a head end device as a video information transmitting system for frequency-multiplexing and transmitting a plurality of video sources selected from a number of video sources at subscribers' requests, an optical fiber cable comprising a number of optical fibers for transmitting the frequency-multiplexed multi-channel signals transmitted by the head end device, and terminal means for receiving a picture and audio signal sent out from the head end device and transferred through the optical fiber cable.

FIG. 3 shows an example of a conventional configuration of the above-mentioned head end device. In FIG. 3, M ($=l \times m$) video sources 1(1) to 1($l \times m$) are constituted by a video reproducing apparatus such as a VTR (video tape recorder), a VD (video disk), or the like. Pulse FM-modulators 2(1) to 2($l \times m$) respectively correspond to the video sources 1(1) to 1($l \times m$), for converting video signals from the corresponding video sources into pulse signals and for FM-modulating those pulse signals.

Digital switching means 3 acts as a video selecting means, having M ($=l \times m$) input terminals into which video signals pulse-FM-modulated by the pulse FM modulators 2(1) to 2($l \times m$) are respectively fed. The digital switching means 3 is arranged to select arbitrary ones of the M video signals inputted to the input terminals and to output the selected video signals through arbitrary ones of N ($=n \times l$) output terminals thereof. The digital switching means therefore has $M \times N$ ($=m \times n \times l^2$) cross points.

A controller 4 determines through which of the N output terminals the arbitrarily selected ones of the M video signals received by the M input terminals of the digital switching means 3 are to be outputted. To this end, the controller 4 is constituted by a computer connected to subscribers through leased data communication circuits.

Up converters 5(1) to 5($l \times m$) are arranged respectively to receive video signals from the N ($=n \times l$) output terminals of the digital switching means 3 and up convert the received video signals. The up converters 5(1) to 5($l \times m$) are divided into l groups each constituted by n up converters. The n up converters of each group divide a transmission band of an optical fiber into n parts and up convert the video signals into n different frequencies. The n signals up-converted by the n up converters of each group are put into n input terminals of corresponding ones of l mixers 6(1) to 6(l) which FM-multiplex the signals. The FM-multiplexed signals in the mixers 6(1) to 6(l) are put respectively into corresponding electro-optical (E/O) converters 7(1) to 7(l) and are converted into optical signals therein. The thus converted optical signals respectively are made incident into corresponding l optical fibers 8(1) to 8(l) constituting an optical fiber cable 8 and are transmitted therethrough.

Each of the l optical fibers 8(1) to 8(l) of the optical fiber cable 8 is led at its terminal to a corresponding optoelectric (O/E) converter 10 provided just before a distributor 9 as shown in FIG. 4. The optical signal transmitted through the optical fiber is converted into an electric signal in the O/E converter 10. The electric signal converted by the O/E converter 10 is distributed to a number of coaxial cables 11 by the distributor 9, and is transmitted through the coaxial cables 11 to terminal devices 12 installed in corresponding subscribers' houses.

Each terminal device 12 is constituted by a tuner 12a for selecting a desired channel from the multi-channel electric signal transmitted through the coaxial cable 11, a demodulator 12b for demodulating the signal of the channel selected by the tuner 12a, and a CPU 12c for controlling the channel selection operation of the tuner 12a and for performing data exchange with the above-mentioned head end device through a leased data communication circuit 13. A video apparatus 14 such as a television receiver, a monitor television or the like is connected to the output of the demodulator 12b, and an operating keyboard 15 for entering various data, such as a picture request, is connected to the CPU 12c.

Different frequencies are assigned to respective terminal devices in advance. To this end, a frequency-fixed down converter may be used in place of the tuner 12a.

In the above-mentioned configuration, video signals from n video sources are frequency-multiplexed and multi-channeled. The frequency-multiplexed and multi-channeled signals are transmitted through each optical fiber of the optical fiber cable 8 to the corresponding distributor 9 connected to the optical fiber through the corresponding O/E converter 10. Those n video sources have been selected on the basis of requests transmitted to the controller 4 through leased data communication circuits from a number of terminal devices 12 connected with the distributor 9 through the coaxial cables 11.

As has been described above, in a head end device in the conventional video information transmission service system, for fibers constituting an optical fiber cable n channels in each fiber, and M ($=m \times l$) video sources, the digital switching means 3 requires a number of cross points as expressed by the following equation, depending on the number of its input terminals M and the number N of its output terminals.

$$M \times N = (m \times l) \times (n \times l)$$
$$= m \times n \times l^2$$

Generally, the cost of the digital switching means 3 is proportional to the number of cross points thereof, and therefore an increase in the number of cross points raises cost greatly in a head end device and hence to a system.

SUMMARY OF THE INVENTION

Therefore, it is an object of the present invention to provide a video information transmission service system and a head end device for use therein, in which the number of cross points of a digital switching means to be used in an animation image transmitting system is reduced, thereby decreasing the cost.

In order to attain the above and other objects, according to the present invention, the video information transmission service system includes: a plurality of video source groups, each constituted by a plurality of video sources; a plurality of video selecting means, respectively corresponding to the plurality of video source groups. Each of the plurality of video selecting means is provided with input terminals for inputting video signals from the respective video sources and output terminals for outputting the received video signals, so that desired ones of the video signals inputted through the input terminals are outputted through the output terminals.

The inventive system further includes a plurality of frequency converting means, respectively corresponding to the plurality of video selecting means, each of the plurality of frequency converting means converting the video signals fed thereto from a corresponding one of the plurality of selecting means to the same frequency which is different from the frequencies of the video signals converted by other ones of the plurality of frequency converting means. The system also includes a plurality of mixing means receiving and FM-multiplexing a set of respective ones of the frequency-converted video signals, and a plurality of electro-optical converting means, respectively corresponding to the plurality of mixing means, each of the plurality of electro-optical converting means converting the FM-multiplexed video signals into an optical signal.

Another feature of the invention is an animation image transmitting system for transmitting the optical signals converted by the plurality of electro-optic converting means to optical fibers of an optical fiber cable; communication means communicating with the animation image transmitting system. The invention further includes control means for selecting a frequency of a tuner coincident with a frequency of a channel indicated by the video information transmitting system, and a terminal device for demodulating an output of the tuner to thereby obtain picture and voice outputs.

In the above-mentioned configuration, a plurality of video selecting means correspond to a plurality of video source groups each constituted by a plurality of video sources. Each of the plurality of video selecting means is provided with input terminals for inputting video signals from the respective video sources and output terminals for outputting the received video signals, so that desired ones of the video signals inputted through the input terminals are outputted through the output terminals. The plurality of video signals from the plurality of output terminals of each video selecting means are converted so as to have the same frequency by frequency converting means corresponding to the video selecting means. A set of respective ones of the frequency-converted video signals (which have different frequencies from each other, in accordance with the operation of the plurality of frequency converting means) are put into each of a plurality of mixing means to produce an FM-multiplexed video signal. The FM-multiplexed video signal is converted to an optical signal by electro-optical converting means and then transferred to corresponding one of optical fibers of an optical fiber cable.

Now let the number of the optical fibers of the optical fiber cable be l, the number of the optical signals to be FM-multiplexed and transferred to each optical fiber (that is, the number of channels) be n and let the number of the video sources of each video source group be m. Then, the number of the video sources becomes n and the number of video selecting means becomes n. Further the respective numbers of the input and output terminals of each video selecting means become m and l respectively, so that the number of cross points thereof becomes m×l. Therefore, the cost of the video selecting means corresponds to the {the number (n) of the video selecting means}×{the number of cross points (m×l)}×{unit cost of a cross point}, that is, n×m×l×{unit cost}. This cost is 1/l of the conventional cost n×m×l².

BRIEF DESCRIPTION OF THE DRAWINGS

The foregoing and other objects and features of the invention now will be explained in greater detail with reference to the accompanying drawings, in which.

An embodiment of the present invention now will be described hereunder with reference to the drawings.

Figure 1:
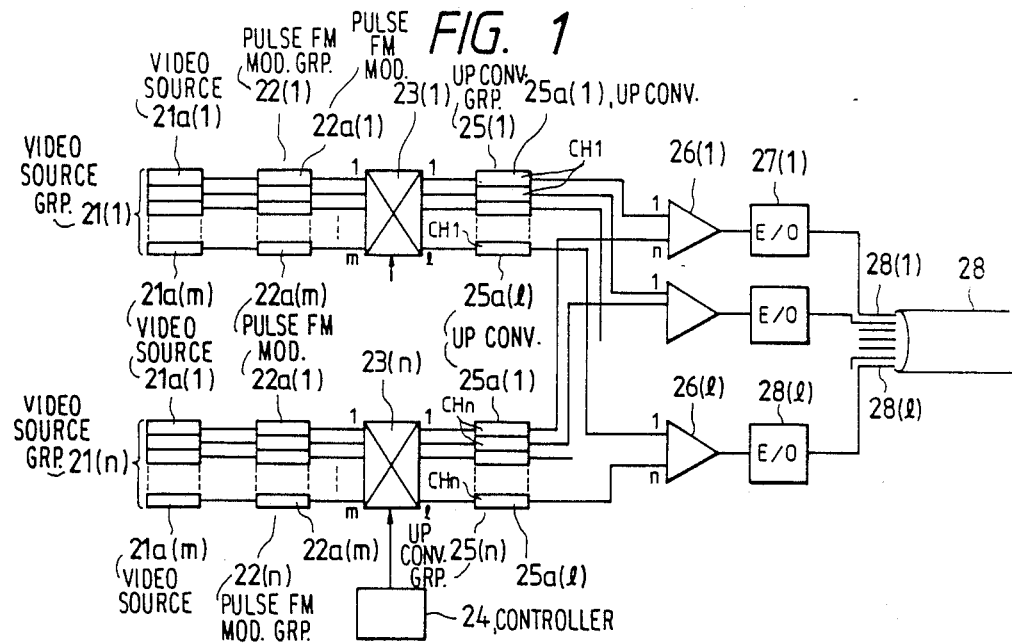
FIG. 1 is a block diagram illustrating an embodiment of a head end device of a video information transmission service system according to the present invention.

FIG. 1 is a block diagram illustrating an embodiment of a head end device as a video transmitting system in a video information transmission service system according to the present invention. In FIG. 1, the reference numerals 21(1) to 21(n) represent n video libraries, that is, n video source groups. Each video library is constituted by m video sources 21a(1) to 21a(m) and the total number M of the video sources is therefor n×m. Each video source is a video reproducing apparatus such as a VTR, a VD, etc.

The reference numerals 22(1) to 22(n) represent n pulse FM modulator groups provided corresponding to the respective n video source groups 21(1) to 21(n). Each pulse FM modulator group is constituted by m pulse modulators 22a(1) to 22a(m) in which respective video signals from the corresponding video sources are converted into pulse signals and then the pulse signals are FM-modulated respectively.

The reference numerals 23(1) to 23(n) represent n digital switching means acting as video selecting means. Each digital switching means is provided with m input terminals and l output terminals, and arranged so that the respective video signals, which are pulse-FM-modulated by the m pulse FM modulators 22a(1) to 22a(m) constituting the corresponding pulse FM modulator group, are put into the corresponding input terminals, and l arbitrary ones of the m video signals received by the m input terminals are put out arbitrarily from the l output terminals. To this end, each digital switching means has (m×l) cross points.

At the subscribers' request, a controller 24 decides the l output terminals through which the l arbitrary ones of the m video signals received by the m input terminals of each of the above-mentioned digital switching means 23(1) to 23(n) are to be put out respectively. To this end, the controller 24 comprises a computer connected with subscribers through leased data communication circuits.

The reference numerals 25(1) to 25(n) represent n up converter groups acting as frequency converters provided corresponding to the respective digital switching means 23(1) to 23(n). Each up converter group is constituted by l up converters 25a(1) to 25a(l). The respective video signals from the corresponding output terminals of the corresponding digital switching means are input to the corresponding up converters 25a(1) to 25a(l) and are up-converted therein. Each of the up converter groups 25(1) to 25(n) up-converts the l video signals fed to the input terminals thereof to one of n different frequencies into which a transmission band of an optical fiber is divided. That is, the up converter groups 25(1) to 25(n) up-convert the signals fed thereto into signals respectively having frequencies of channels CH1 to CHn which are transmitted through an optical fiber cable.

The reference numerals 26(1) to 26(l) represent l mixers, each having n inputs. The l mixers are arranged so that the respective outputs of the l up converters 25a(1) to 25a(l) of the up converter group 25(1) are put into the first one of the n inputs of each mixer, the respective outputs of the l up converters 25a(1) to 25a(l) of the up converter group 25(2) are put into the second one of the l inputs of each mixer, and succeedingly the respective outputs of the l up converters 25a(1) to 25a(l) of the up converter group 25(n) are put into the n-th one of the l inputs of each mixer. Each of the l mixers 26(1) to 26(l) FM-multiplexes the n signals fed thereto. The FM-multiplexed signals from each of l mixers 26(1) to 26(l) are respectively correspondingly fed into l electro-optical (E/0) converters 27(1) to 27(l) and are converted into optical signals therein. The optical signals then are respectively correspondingly transmitted into l optical fibers 28(1) to 28(l) which together constitute an optical fiber cable 28.

Figure 2:
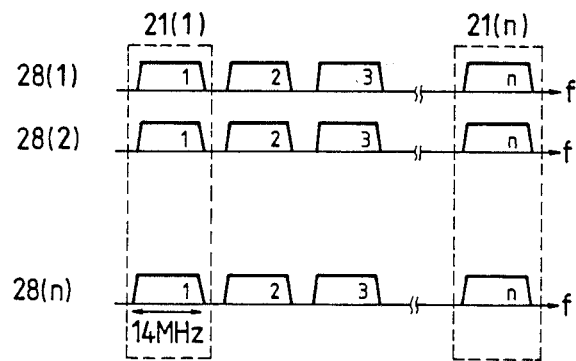
FIG. 2 is a diagram illustrating video sources transmitted through an optical fiber cable using the apparatus of FIG. 1.
Figure 3:
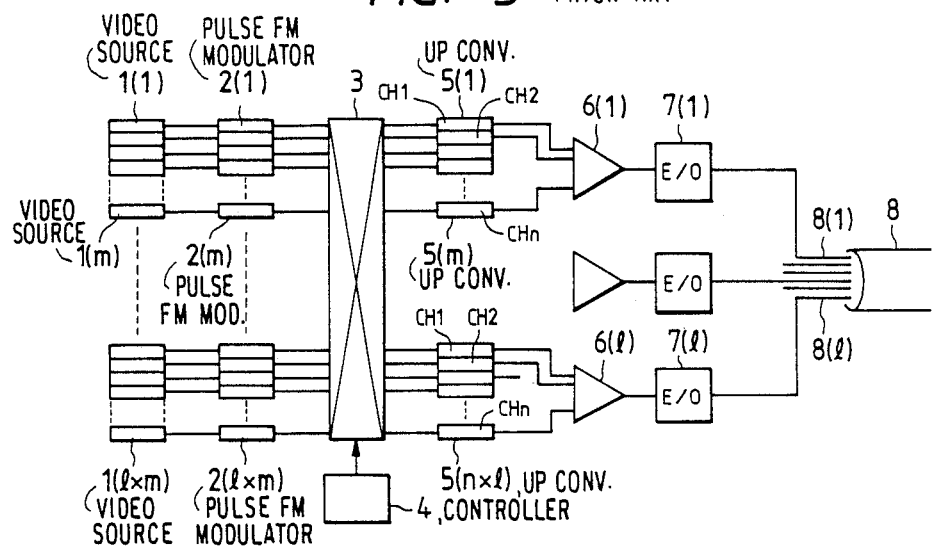
FIG. 3 is a block diagram illustrating an example of a conventional apparatus.
Figure 4:
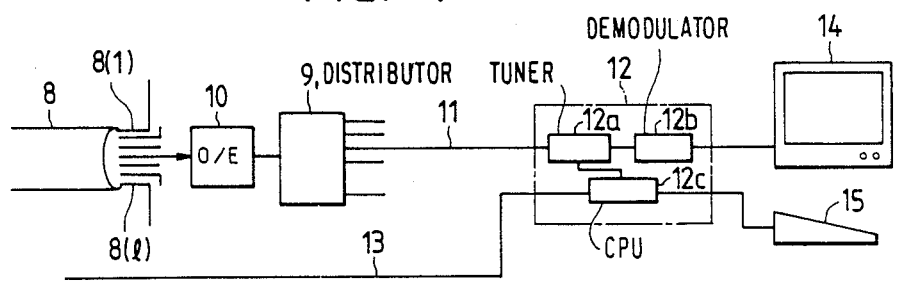
FIG. 4 is a block diagram illustrating an example of a video information transmission service system.

Each of the l optical fibers 28(1) to 28(l) of the optical fiber cable 28 frequency-converts video signals from respective video sources selected from corresponding libraries, as shown in FIG. 2, into multi-channel signals for transmission through the cable. Then, as has been described with reference to FIG. 4, the optical signals transmitted through the optical fibers reach corresponding opto-electric (0/E) converters and are converted into electric signals therein. The electric signals are distributed by distributors to a number of coaxial cables so that the electric signals are transmitted through the coaxial cables to terminal means installed in corresponding subscribers' houses.

In each of the above-mentioned terminal means, a so-called channel selection is performed by a tuner to select a desired one of the channels through which multi-channel electric signals are transmitted through a coaxial cable, and demodulation of the signal in the channel selected by the tuner is performed by a demodulator. The operation of the channel selection by the tuner is controlled by a CPU connected to an operating keyboard for entering various data. The CPU performs data exchange with the above-mentioned head end device through a leased data communication circuit so as to perform channel selection upon reception of indication of a channel properly corresponding to its own request in accordance with instructions from a computer of the head end device. The output of the above-mentioned demodulator is put into a video apparatus such as a television receiver, a monitor television or the like. The operating keyboard is used to enter various data into the CPU not only for channel selection request but also for picture request.

In the above configuration, in each of the optical fibers of the optical fiber cable connected to the distributor 9 through the 0/E converter, video signals from n video sources selected respectively one by one from the n libraries 21(1) to 21(n) are transmitted in frequency-multiplexed form and are put in multi-channels. The selection of the n video sources is performed in response to requests transmitted to the controller 24 through leased data communication circuits from a number of terminal devices connected to the distributor 9 through coaxial cables.

Then, if a certain subscriber makes a request for a certain video source, the computer gives the terminal CPU an indication of, for example, a channel CH1 corresponding to a video source group, for example, 21(1), to which the requested video source belongs. The CPU causes the tuner to select the channel CH1 in accordance with the indication.

In this case, other subscribers connected to the same optical fiber cannot select a video source belonging to the video source group 21(1), and therefore a problem of queuing time occurs. To solve this problem, for example, the same sources are provided in the video source groups 21(1) and 21(2), and so on.

In the above-mentioned embodiment of the head end device according to the present invention, the number of optical fibers of an optical fiber cable is l, the number of optical signals FM-multiplexed and transmitted through each optical fiber, that is, the number of channels is n, and the number of video sources of each video source group is m. Accordingly, the number of video source groups is n and the number of video selecting means is n. The number of input terminals of each video selecting means is m and the number of output terminals of the same is l. The number of cross points therefore is m×l.

Consequently, the cost of video selecting means corresponds to {the number (n) of video selecting means}×{the number of cross points (m×l)}×{the unit cost of a cross point}, that is, n×m×l×{the unit cost}. This cost is 1/l of the conventional cost n×m×l$^2$.

Although pulse-FM-modulated signals are to be switched by digital switching means in this embodiment, it is possible to realize the present invention by using a usual FM or AM modulator in place of the pulse FM modulator and a base band type video switching means in place of the digital switching means, with the order of the modulator and the video switching means being switched.

As has been described above, according to the present invention, a plurality of video selecting means acting as digital switching means respectively correspond to a plurality of video source groups each having a plurality of video sources. Each of the plurality of video selecting means is provided with input terminals for inputting video signals from the respective video sources and output terminals for outputting the received video signals, so that desired ones of the video signals inputted through the input terminals are outputted through the output terminals, and the video signals outputted from the output terminals of each video selecting means are converted into signals of the same frequency by means of each frequency converting means which correspond to the video selecting means. A set of respective ones of the video signals, which have been frequency-converted so as to have frequencies different from each other by means of the plurality of frequency converting means, are put into each of a plurality of mixing means so as to produce an FM-multiplexed video signal. The FM-multiplexed video signal is converted into an optical signal by an electro-optic means and then is transmitted to each of optical fibers of an optical fiber cable. It therefore is possible to reduce the number of video selecting means, that is, the number of cross points of a digital switching means and to thereby reduce cost significantly.

What is claimed is:

1. A video information transmission service system comprising:

a plurality of video source groups, each comprising a plurality of video sources for outputting video signals;

a plurality of video selecting means, corresponding to respective ones of said plurality of video source groups, for receiving and outputting said video signals from said video sources, each of said plurality of video selecting means including input terminals for receiving and inputting said video signals from said respective video sources and output terminals for outputting the received video signals, so that desired ones of the video signals inputted through said input terminals are outputted through said output terminals;

a plurality of frequency converting means, corresponding to respective ones of said plurality of video selecting means and each operating at a different respective particular frequency, for frequency converting the outputted video signals, each of said plurality of frequency converting means outputting respective converted video signals which have said different respective particular frequency;

a plurality of mixing means for receiving respective ones of the converted video signals from said plurality of frequency converting means and FM-multiplexing the converted video signals to produce FM-multiplexed video signals;

a plurality of electro-optical converting means respectively corresponding to said plurality of mixing means, each of said plurality of electro-optical converting means converting the FM-multiplexed video signals into optical signals;

video transmitting system having a plurality of channels for transmitting the optical signals to optical fibers of an optical fiber cable;

communication means for enabling communication with said video transmitting system and a transmission system;

control means for making a selection frequency of a tuner coincident with a frequency of a channel indicated by said video transmitting system; and a terminal device for demodulating an output of said tuner to obtain picture and voice outputs.

2. A video information transmission service system as claimed in claim 1, wherein said plurality of frequency converting means comprise means for up-converting the outputted video signals.

3. A video information transmission service system as claimed in claim 1, wherein said plurality of video selecting means comprises a plurality of digital switching means having m input terminals and l output terminals, such that, for n of said video source groups, the total number of cross points required is $n \times m \times l$.

4. A head end device for a video information transmission service system, comprising:

a plurality of video source groups, each comprising a plurality of video sources for outputting video signals;

a plurality of video selecting means, corresponding to respective ones of said plurality of video source groups, for receiving and outputting said video signals from said video sources, each of said plurality of video selecting means including input terminals for receiving and inputting said video signals from said respective video sources and output terminals for outputting the received video signals, so that desired ones of the video signals inputted through said input terminals are outputted through said output terminals;

a plurality of frequency converting means, corresponding to respective ones of said plurality of video selecting means and each operating at a different particular respective frequency, for frequency converting the outputted video signals, each of said plurality of frequency converting means outputting respective converted video signals which have said different particular respective frequency;

a plurality of mixing means for receiving respective ones of the converted video signals from said plurality of frequency converting means and FM-multiplexing the converted video signals to produce FM-multiplexed video signals;

a plurality of electro-optical converting means respectively corresponding to said plurality of mixing means, each of said plurality of electro-optical converting means converting the FM-multiplexed video signals into optical signals; and an optical fiber cable to which said optical signals are transmitted.

5. A head end device for a video information transmission system as claimed in claim 4, wherein said plurality of frequency converting means comprise means for up-converting the outputted video signals.

6. A head end device for a video image information transmission system as claimed in claim 4, wherein said plurality of video selecting means comprise a plurality of digital switching means having m input terminals and l output terminals, such that, for n of said video source groups, the total number of cross points required is $n \times m \times l$.

* * * * *